United States Patent
You

(10) Patent No.: US 12,440,341 B2
(45) Date of Patent: Oct. 14, 2025

(54) METHOD FOR PRODUCING COMPOSITION FOR REGENERATING CARTILAGE USING LYOPHILIZATION HYALINE CARTILAGE POWDER, COMPOSITION FOR REGENERATING CARTILAGE PRODUCED USING THE SAME, METHOD FOR PRODUCING SCAFFOLD FOR REGENERATING PATIENT-CUSTOMIZED CARTILAGE USING COMPOSITION FOR REGENERATING CARTILAGE, AND SCAFFOLD FOR REGENERATING PATIENT-CUSTOMIZED CARTILAGE

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 816 days.

(21) Appl. No.: 17/438,121

(22) PCT Filed: Mar. 11, 2020

(86) PCT No.: PCT/KR2020/003376
§ 371 (c)(1),
(2) Date: Sep. 10, 2021

(87) PCT Pub. No.: WO2020/184974
PCT Pub. Date: Sep. 17, 2020

(65) Prior Publication Data
US 2022/0175535 A1    Jun. 9, 2022

(30) Foreign Application Priority Data
Mar. 11, 2019  (KR) .................. 10-2019-0027705

(51) Int. Cl.
*A61F 2/30* (2006.01)
*A61L 27/36* (2006.01)
(Continued)

(52) U.S. Cl.
CPC ...... *A61F 2/30756* (2013.01); *A61L 27/3612* (2013.01); *A61L 27/3654* (2013.01);
(Continued)

(58) Field of Classification Search
CPC ........ A61F 2/30756; A61F 2002/30766; A61F 2002/30985; A61F 2002/30957;
(Continued)

(56) References Cited

U.S. PATENT DOCUMENTS

2004/0219182 A1   11/2004   Gomes et al.
2013/0034524 A1   2/2013    Agha-Mohammadi
(Continued)

FOREIGN PATENT DOCUMENTS

CN   103272288 A   9/2013
CN   104302760 A   1/2015
(Continued)

OTHER PUBLICATIONS

Lee, Jungsun, et al. "Comparison of articular cartilage with costal cartilage in initial cell yield, degree of dedifferentiation during expansion and redifferentiation capacity." Biotechnology and applied biochemistry 48.3 (2007): 149-158. (Year: 2007).*
(Continued)

*Primary Examiner* — Jerrah Edwards
*Assistant Examiner* — Jose H. Trevino, III
(74) *Attorney, Agent, or Firm* — Osha Bergman Watanabe & Burton LLP

(57) ABSTRACT

The present invention relates to a method for using a lyophilization hyaline cartilage powder to produce a composition for regenerating cartilage, and a composition for
(Continued)

GENERAL HYALINE CARTILAGE TISSUE

GENERAL HYALINE CARTILAGE POWDER regenerating cartilage produced by using the method, the method comprising: A) a step for preparing hyaline cartilage; B) a step for freeze-drying and crushing the hyaline cartilage, and producing a lyophilization hyaline cartilage powder; C) a step for producing an adipose tissue extract from autologous adipose tissue; and D) a step for producing a composition which is for regenerating cartilage and including the lyophilization hyaline cartilage powder and the adipose tissue extract.

8 Claims, 4 Drawing Sheets

(51) Int. Cl.
*B33Y 70/10* (2020.01)
*B33Y 80/00* (2015.01)

(52) U.S. Cl.
CPC .............. *B33Y 70/10* (2020.01); *B33Y 80/00* (2014.12); *A61F 2002/30766* (2013.01); *A61F 2002/30985* (2013.01); *A61L 2400/06* (2013.01); *A61L 2430/06* (2013.01)

(58) Field of Classification Search
CPC ............. A61F 2/30942; A61L 27/3612; A61L 27/3654; A61L 2400/06; A61L 2430/06; A61L 27/16; A61L 27/18; A61L 27/222; A61L 27/225; A61L 27/3604; A61L 27/3691; A61L 27/50; A61L 27/3625; B33Y 70/10; B33Y 80/00
See application file for complete search history.

(56) References Cited

U.S. PATENT DOCUMENTS

| | | | | |
|---|---|---|---|---|
| 2016/0235892 | A1* | 8/2016 | Detamore | A61K 9/0024 |
| 2017/0348458 | A1* | 12/2017 | Kesti | B33Y 10/00 |
| 2018/0344327 | A1* | 12/2018 | Jeng | A61B 17/1635 |

FOREIGN PATENT DOCUMENTS

| | | |
|---|---|---|
| CN | 206027182 U | 3/2017 |
| EP | 3747477 A1 | 12/2020 |
| KR | 20130037324 A | 4/2013 |
| KR | 20140147805 A | 12/2014 |
| KR | 20170012099 A | 2/2017 |
| WO | 2010083051 A2 | 7/2010 |
| WO | 2019151597 A1 | 8/2019 |

OTHER PUBLICATIONS

Jang, Yeonsue, et al. "Characterization of adipose tissue-derived stromal vascular fraction for clinical application to cartilage regeneration." In Vitro Cellular & Developmental Biology-Animal 51 (2015): 142-150. (Year: 2015).*

MÃ¼ller, A. M., et al. "Towards an intraoperative engineering of osteogenic and vasculogenic grafts from the stromal vascular fraction of human adipose tissue." European Cells and Materials 19 (2010): 127-135. (Year: 2010).*

MÃ¼ller, A. M., et al. "Towards an intraoperative engineering of osteogenic and vasculogenic grafts from the stromal vascular fraction of human adipose tissue." European Cells and Materials (Year: 2010).*

International Search Report issued in International Application No. PCT/KR2020/003376 dated Jul. 7, 2020 (3 pages).

Written Opinion issued in International Application No. PCT/KR2020/003376 dated Jul. 7, 2020 (5 pages).

Utomo, D. N. et al. "Regeneration Mechanism of Full Thickness Cartilage Defect Using Combination of Freeze Dried Bovine Cartilage Scaffold—Allogenic Bone Marrow Mesenchymal Stem Cells—Platelet Rich Plasma Composite (SMPC) Implantation" Journal of Biomimetics, Biomaterials and Biomedical Engineering ISSN: 2296-9845, vol. 31, pp. 70-82 (13 pages).

Jang, Y. et al. "Characterization of adipose tissue-derived stromal vascular fraction for clinical application to cartilage regeneration" In Vitro Cell.Dev.Biol.-Animal (2015) 51:142-150 (9 pages).

Muller, A. M. et al. "Towards an Intraoperative Engineering of Osteogenic and Vasculogenic Grafts From the Stromal Vascular Fraction of Human Adipose Tissue" European Cells and Materials vol. 19 2010 (pp. 127-135) (9 pages).

Office Action issued in Chinese Application No. 202080028996.0, mailed on Oct. 18, 2022 (7 pages).

Decision of Refusal issued in Japanese Application No. 2021-555016, mailed on Nov. 8, 2022 (9 pages).

"Regeneration Mechanism of Full Thickness Cartilage Defect Using Combination of Freeze Dried Bovine Cartilage Scaffold-AllogenicBone MarrowMesenchymal Stem Cells-Platelet Rich Plasma Composite (SMPC) Implantation;" Journal of Biomimetics, Biomaterials and Biomedical Engineering; vol. 31; 2017; pp. 70-82.

"Characterization of adipose tissue-derived stromal vascular fraction for clinical application to cartilage regeneration;" In Vitro Cell.Dev.Biol.-Animal; vol. 51; 2015; pp. 142-150.

Extended European Search Report issued in European Application No. 20769602.2, mailed on Aug. 11, 2022 (8 pages).

Pak Jaewoo et al.; "Clinical Protocol of Producing Adipose Tissue-Derived Stromal Vascular Fraction for Potential Cartilage Regeneration;" Journal of Visualized Experiments; No. 139; Jan. 1, 2018.

Office Action issued in corresponding CN Application No. 202080028996.0 with English translation dated Mar. 25, 2022 (17 pages).

Yang, Z. et al. "Research on Preparation and Characters of Decellularized Cartilage Matrix for Tissue Engineering" Chinese Journal of Reparative and Reconstructive Surgery, Oct. 2008, vol. 22, No. 10, pp. 1232-1237 (6 pages).

Chen, P. "The Experimental study of adipose tissue derived stromal vascular fraction for articular cartilage of the knee repair in rat" Chinese Doctoral Dissertations & Master's Theses Full-text Database (Master) Medicine and Health Sciences, Oct. 1, 2019 No. 1, E066-1047 (4 pages).

* cited by examiner

[Fig. 1]
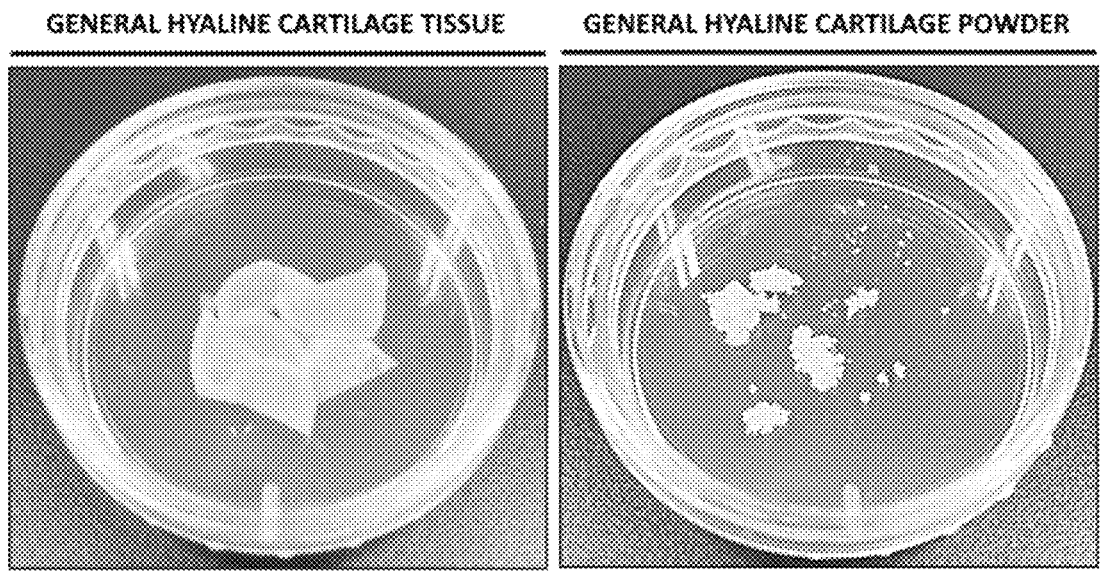
[Fig. 2]
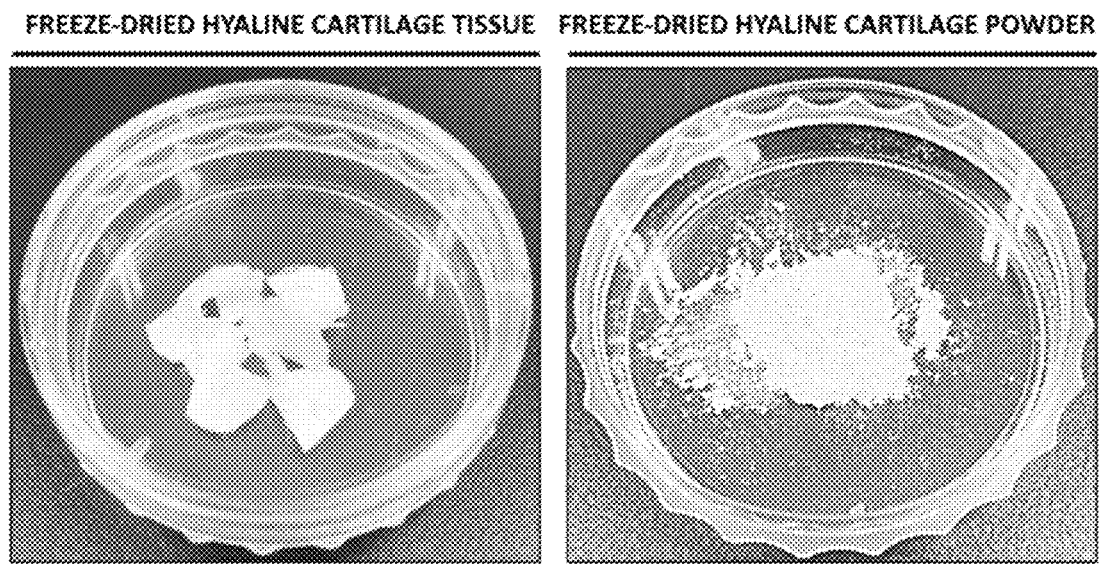

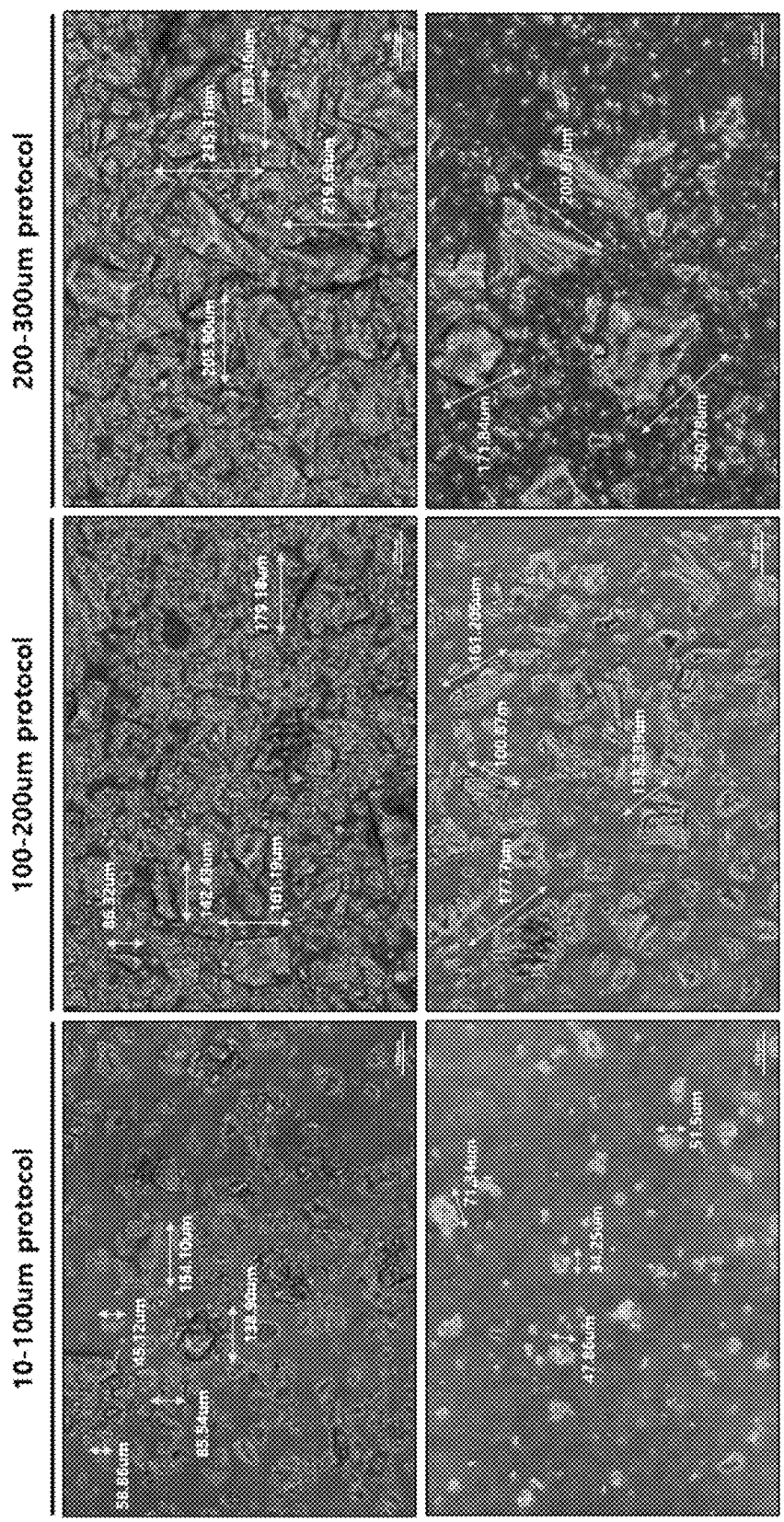
[Fig. 3]

[Fig. 4]
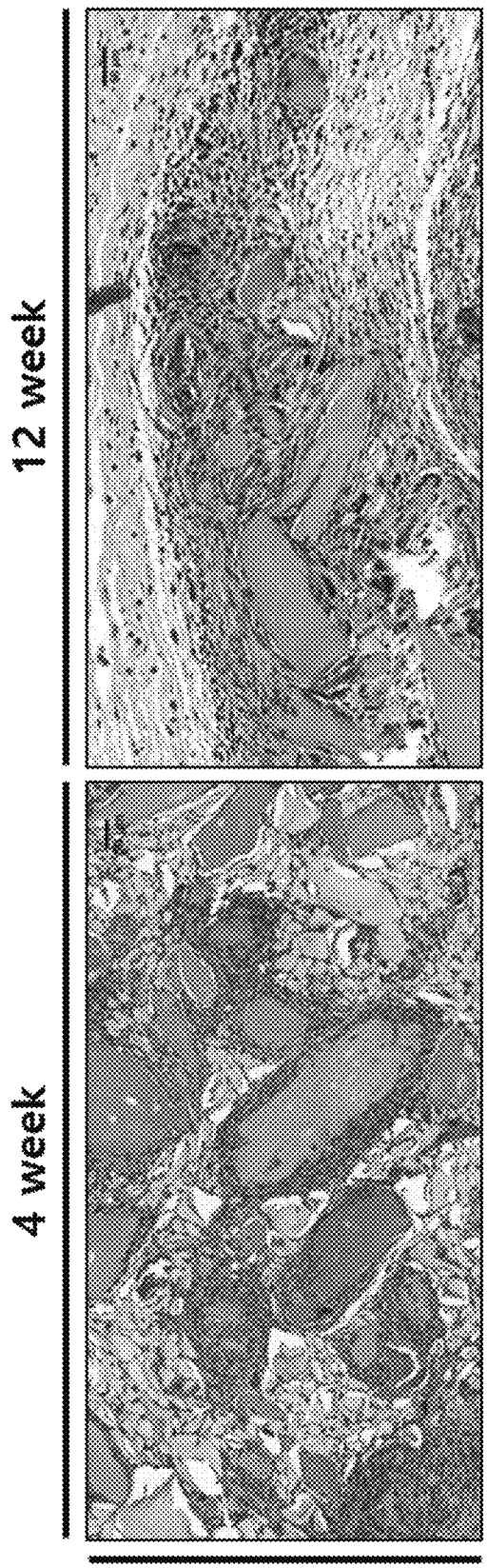

[Fig. 5]
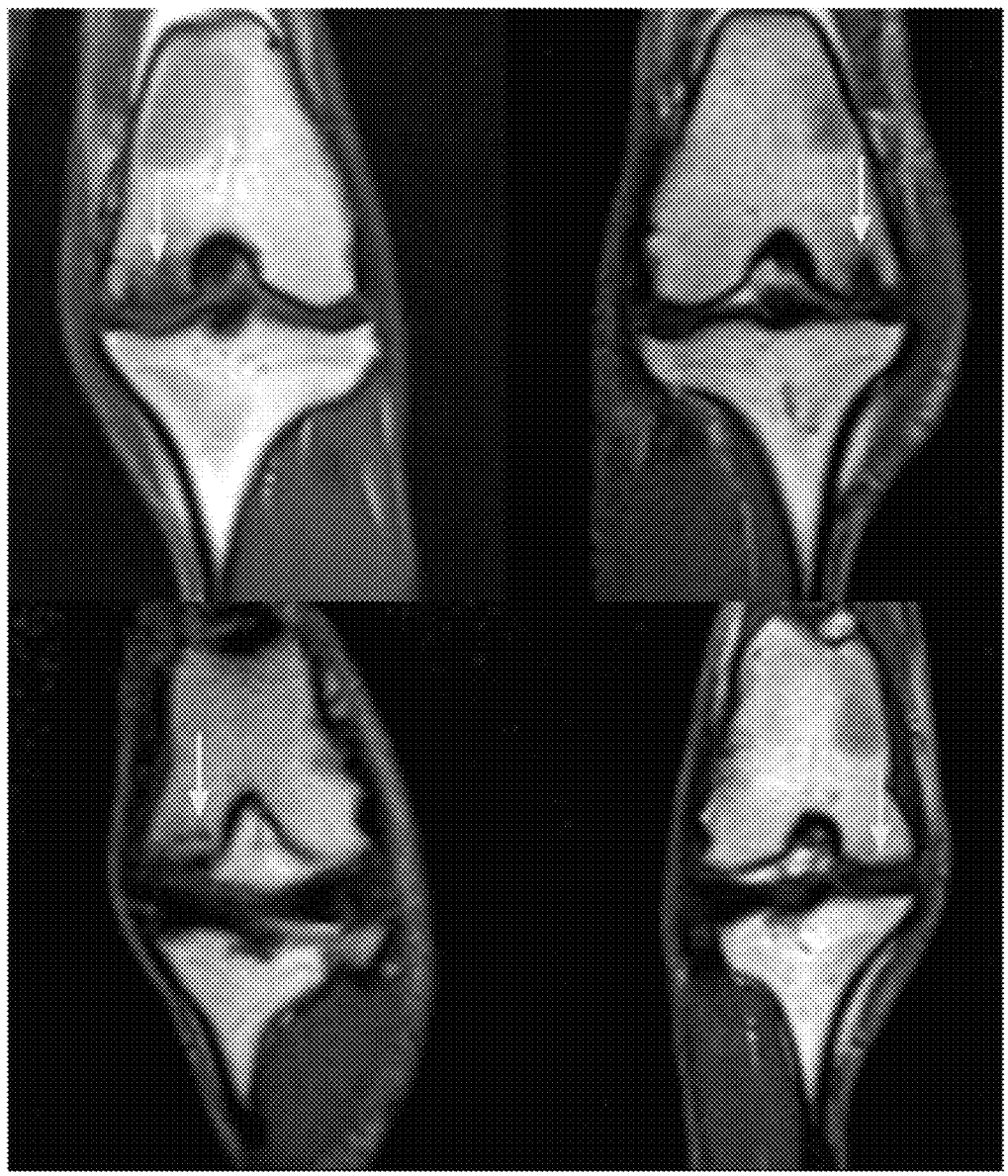

METHOD FOR PRODUCING COMPOSITION FOR REGENERATING CARTILAGE USING LYOPHILIZATION HYALINE CARTILAGE POWDER, COMPOSITION FOR REGENERATING CARTILAGE PRODUCED USING THE SAME, METHOD FOR PRODUCING SCAFFOLD FOR REGENERATING PATIENT-CUSTOMIZED CARTILAGE USING COMPOSITION FOR REGENERATING CARTILAGE, AND SCAFFOLD FOR REGENERATING PATIENT-CUSTOMIZED CARTILAGE

CROSS-REFERENCE TO RELATED APPLICATION

This application claims priority to and the benefit of Korean Patent Application No. 10-2019-0027705, filed on Mar. 11, 2019, the disclosure of which is incorporated herein by reference in its entirety.

BACKGROUND

Technical Field

The present specification relates to a method of preparing a composition for regenerating cartilage using lyophilization hyaline cartilage powder, a composition for regenerating cartilage prepared by the method, a method of producing a patient-customized scaffold for regenerating cartilage using the composition for regenerating cartilage, and a patient-customized scaffold for regenerating cartilage.

Background Art

At a hinge part where bones meet in the human body, articular cartilage consisting of hyaline cartilage comes into contact with each other and exerts internal pressure and tensile force, and in each joint, there is a synovial capsule holding a synovial fluid, reducing the friction caused by joint motion.

Although the cause of degenerative change in articular cartilage is not yet identified, an absolute decrease in the number of chondrocytes and the imbalance between synthesis and decomposition of cartilage matrix, occurring in chondrocytes, are known as one cause. Therefore, the degenerative change in articular cartilage reduces cartilage strength and the cushioning ability of articular cartilage due to the decomposition of the cartilage matrix.

Since implanted cells lean to one direction due to gravity, it is difficult for conventional cell therapeutic agents to be uniformly distributed in a damaged area, and cell regeneration in defective cartilage areas is reduced due to difficulty in cell engraftment. In addition, in the case of autologous chondrocyte and stem cell transplantation, since tissue is extracted and then applied to a patient after culturing, two surgeries are required, and an approximate 4-week cell culture or manipulation is required. Moreover, it is difficult for transplanted cells to be evenly distributed and grafted in a damaged area due to gravity, and there is a problem in that the differentiation into fibrocartilage, rather than hyaline cartilage, is induced, leading to a phenomenon in which cartilage is easily broken. Therefore, it is necessary to develop a method that can effectively perform cell regeneration of the defective cartilage area.

RELATED ART DOCUMENT

Patent Document (Patent Document 1) Korean Laid-Open Patent Application No. 10-2017-0012099

SUMMARY

The present invention is directed to providing a method of preparing a composition for regenerating cartilage using lyophilization hyaline cartilage powder, a composition for regenerating cartilage prepared by the method, a method of producing a patient-customized scaffold for regenerating cartilage using the composition for regenerating cartilage, and a patient-customized scaffold for regenerating cartilage. Further, the present invention is directed to providing a medical kit for regenerating cartilage using a composition for regenerating cartilage.

One aspect of the present invention provides a method of preparing a composition for regenerating cartilage using lyophilization hyaline cartilage powder, which includes: A) preparing hyaline cartilage; B) preparing lyophilization hyaline cartilage powder by freeze-drying and crushing the hyaline cartilage; C) preparing an adipose tissue extract from an autologous adipose tissue; and D) preparing a composition for regenerating cartilage which includes the lyophilization hyaline cartilage powder and the adipose tissue extract.

Another aspect of the present invention provides a composition for regenerating cartilage prepared by the above-described method.

Still another aspect of the present invention provides a method of producing a patient-customized scaffold for regenerating cartilage, which includes: a) obtaining 3D data of a defective cartilage area using a 3D scanner, and forming a mold for a scaffold using a 3D printer; b) preparing a first liquid by mixing fibrinogen with the composition for regenerating cartilage using the lyophilization hyaline cartilage powder, and forming a first layer by coating the inside of the mold for a scaffold with the first liquid; c) forming a second layer by coating the first layer with a second liquid containing thrombin; and d) forming a scaffold for regenerating cartilage by reacting the first layer and the second layer.

Yet another aspect of the present invention provides a patient-customized scaffold for regenerating cartilage, produced by the method of producing a patient-customized scaffold for regenerating cartilage.

Yet another aspect of the present invention provides a medical kit for regenerating cartilage in which the composition for regenerating cartilage is charged in a syringe for human injection.

Yet another aspect of the present invention provides a method of treating defective cartilage, which includes injecting the composition for regenerating cartilage into a defective cartilage area.

Advantageous Effects

A composition for regenerating cartilage according to the present invention can be easily and immediately prepared and applied in the procedure for generating defective cartilage. Specifically, since the composition for regenerating cartilage of the present invention uses lyophilization hyaline cartilage powder, the composition for regenerating cartilage can be prepared immediately by obtaining an adipose tissue-derived stromal vascular fraction from a patient in the procedure while the lyophilization hyaline cartilage powder is stored.

The composition for regenerating cartilage according to the present invention can promote cartilage regeneration using a patient-customized scaffold for regenerating cartilage or by direct injection into a defective cartilage area.

According to the method of producing a patient-customized scaffold for regenerating cartilage, since a patient-customized scaffold for regenerating cartilage can be immediately produced by 3D scanning the cartilage defect of a lesion in an operation room, the scaffold can be implanted by a single surgical procedure.

Other objects and advantages of the present invention can be more clearly understood by the following detailed description, claims and drawings of the present invention.

BRIEF DESCRIPTION OF THE DRAWINGS

FIG. 1 is a set of images showing hyaline cartilage tissue according to Comparative Example 1 and a result of powdering thereof.

FIG. 2 is a set of images showing a lyophilization hyaline cartilage tissue according to Example 1 and a result of powdering thereof.

FIG. 3 is a set of images showing the results prepared by adjusting particle sizes of hyaline cartilage powder according to Comparative Example 1 and Example 1.

FIG. 4 shows the results after 4 weeks and 12 weeks according to Experimental Example 1.

FIG. 5 shows MRI results according to Experimental Example 2 and Comparative Experimental Example.

DETAILED DESCRIPTION OF THE EMBODIMENTS

In the present invention, when one member is disposed "on" another member, the first member is in contact with the second member, or a third member is interposed between these two members.

In the present invention, when one part "includes" a component, unless particularly mentioned otherwise, another component may be further included rather than excluding other components.

Hereinafter, the present invention will be described in detail.

One aspect of the present invention provides a method of preparing a composition for regenerating cartilage using lyophilization hyaline cartilage powder, which includes: A) preparing hyaline cartilage; B) preparing lyophilization hyaline cartilage powder by freeze-drying and crushing the hyaline cartilage; C) preparing an adipose tissue extract from an autologous adipose tissue; and D) preparing a composition for regenerating cartilage which includes the lyophilization hyaline cartilage powder and the adipose tissue extract.

According to one embodiment of the present invention, the hyaline cartilage may be derived from homologous or heterologous hyaline cartilage with respect to a treatment target. The hyaline cartilage is preferably derived from homologous hyaline cartilage. Specifically, when the cartilage treatment target is a human, hyaline cartilage powder extracted from human hyaline cartilage may be used. In addition, when the cartilage treatment target is an animal, hyaline cartilage powder extracted from the hyaline cartilage of the same species of animal may be used.

According to one embodiment of the present invention, the hyaline cartilage may be derived from costal cartilage. Specifically, when the treatment target using the composition for regenerating cartilage is a human, the hyaline cartilage may be derived from human costal cartilage. In addition, when the treatment target using the composition for regenerating cartilage is an animal, the hyaline cartilage may be derived from costal cartilage of the same species as the treatment target animal. For example, the hyaline cartilage may use commercially-available allogenic costal cartilage.

The lyophilization hyaline cartilage powder may be obtained by freeze-drying the hyaline cartilage and then crushing the lyophilization hyaline cartilage. In addition, the lyophilization hyaline cartilage powder may be obtained by simultaneously freeze-drying and crushing the hyaline cartilage. The freeze drying may use a freeze-drying method generally performed in the art. In addition, the crushing may be used to micronize lyophilization hyaline cartilage into particles with a desired diameter using, for example, a ball milling method. A method of crushing the hyaline cartilage is not limited, and any method that can obtain particles with a desired particle diameter may be applied without limitation.

The lyophilization hyaline cartilage powder may be a component of an implant or the support of a scaffold, which is derived from the composition for regenerating cartilage when the composition for regenerating cartilage is applied to defective cartilage tissue. Specifically, the lyophilization hyaline cartilage powder particles may bind with each other by a bioadhesive, thereby forming an implant or scaffold in the defective cartilage area.

The lyophilization hyaline cartilage powder has the advantage of being stored without separately adjusting temperature or humidity. By using the lyophilization hyaline cartilage powder, the composition for regenerating cartilage has the advantage of being easily prepared immediately after an adipose tissue extract is extracted from a patient. That is, general hyaline cartilage powder may require storage costs since it is stored at a low temperature condition, and in addition, to be mixed with the adipose tissue extract, there may be cases where it is necessary to wait until the temperature increases to a proper temperature. On the other hand, since the composition for regenerating cartilage according to the present invention uses the lyophilization hyaline cartilage powder, there is the advantage of solving the above-described problems.

In addition, the lyophilization hyaline cartilage powder has very high uniformity in particle size and has minimized agglomeration between particles by minimizing a water content. For example, when general hyaline cartilage is micronized, due to water in the hyaline cartilage, crushing may not be evenly performed, and due to the agglomeration between crushed particles, a syringe or a nozzle of a 3D printer may be blocked. Further, due to the agglomerated particles, the general hyaline cartilage powder may not uniformly exhibit an effect when applied to a lesion, or have side effects.

The lyophilization hyaline cartilage powder may release cartilage regeneration-related growth factors, inducing the differentiation of the adipose tissue extract into chondrocytes. Further, a protein included in the lyophilization hyaline cartilage powder may help in facilitating cartilage regeneration in a lesion.

According to one embodiment of the present invention, the lyophilization hyaline cartilage powder may have a particle diameter of 30 μm or more and 300 μm or less.

When the average particle diameter of the lyophilization hyaline cartilage powder is within the above-described range, the differentiation and regeneration of chondrocytes are effectively performed.

According to one embodiment of the present invention, the concentration of the lyophilization hyaline cartilage powder may be 0.5 to 10% (w/v). That is, the lyophilization hyaline cartilage powder may be included at 0.005 to 0.1 g per 1 mL of the composition for regenerating cartilage. The concentration of the lyophilization hyaline cartilage powder is preferably 0.5 to 7% (w/v), more preferably, 0.5 to 3% (w/v), and most preferably 0.7 to 3% (w/v). When the concentration of the lyophilization hyaline cartilage powder is within the above-described range, in the case of implanting the patient-customized scaffold for regenerating cartilage produced using the composition for regenerating cartilage, or forming an implant by injecting the composition for regenerating cartilage into a lesion, the viability of chondrocytes, and the differentiation into and morphology of chondrocytes may be most excellently exhibited.

According to one embodiment of the present invention, the adipose tissue extract may include a stromal vascular fraction isolated from autologous adipose tissue. That is, the adipose tissue extract may include the adipose tissue-derived stromal vascular fraction, which may include adipose tissue-derived stem cells. Preferably, the adipose tissue-derived stromal vascular fraction may not substantially include other cells excluding adipose tissue-derived stem cells (e.g., adipose cells, red blood cells, other stromal cells, etc.) and an extracellular matrix (ECM) material, and more preferably, may include neither other cells nor an ECM material.

The adipose tissue-derived stromal vascular fraction in the adipose tissue extract may be extracted from adipose tissue in a homologous or heterologous animal. Specifically, the adipose tissue-derived stromal vascular fraction in the adipose tissue extract may be extracted from adipose tissue of a homologous or heterologous animal. Preferably, the adipose tissue extract may be extracted from autologous adipose tissue. More specifically, the adipose tissue extract may be extracted using adipose tissue of a treatment target, that is, a patient or animal. The adipose tissue extract (or adipose tissue-derived stromal vascular fraction included therein) may be obtained by shape extraction of a micro or nano SVF/ECM cluster such as an adipose tissue-derived stromal vascular fraction (SVF) and ECM from adipose tissue, and as needed, a pure adipose tissue-derived stromal vascular fraction (SVF) and ECM may be separated and used. In one example, by using a Lipocell kit (Tiss'you), the adipose tissue extract may be an extract obtained from adipose tissue or an adipose tissue-derived extract known as Nanofat. However, the adipose tissue-derived stromal vascular fraction may be obtained using a method and an extraction kit, which are known in the art, but the present invention is not limited thereto.

According to one embodiment of the present invention. Step C) may include:

C1) removing fibers in the autologous adipose tissue using a first filter having a pore diameter of 2 to 3 mm; and
C2) obtaining an adipose tissue extract by sequentially filtering the fiber-free autologous adipose tissue through a second filter having a pore diameter of 450 to 550 μm and a third filter having a pore diameter of 150 to 250 μm.

According to another embodiment of the present invention, Step C) may include:

C1) removing fibers in autologous adipose tissue using a first filter having a pore diameter of 2 to 3 mm; C2) sequentially filtering the fiber-free autologous adipose tissue through a second filter having a pore diameter of 450 to 550 μm and a third filter having a pore diameter of 150 to 250 μm, and crushing the autologous adipose tissue; and C3) obtaining an adipose tissue extract by filtering the crushed autologous adipose tissue through a fourth filter having a pore diameter of 25 to 75 μm, and then collecting a residue collected by the fourth filter.

That is, a filtrate passing through the third filter, or a residue collected by the fourth filter may be used as the adipose tissue extract.

In Step C1), fibers in the extracted autologous adipose tissue may be removed using a first filter having a relatively large pore diameter. Specifically, the first filter in Step C1) may be a syringe filter formed of stainless steel. Specifically, the first filter may have a filter part formed of stainless steel with high strength to effectively isolate fibers from the autologous adipose tissue. More specifically, in Step C1), syringes may be installed at both ends of the first filter, and the extracted autologous adipose tissue may pass through the first filter twice or more, and specifically twice or three times using the piston movement of the syringes. In Step C1), primarily, by filtering the fibers in the autologous adipose tissue, the autologous adipose tissue may be more effectively crushed within a short time.

Step C2) may include crushing the autologous adipose tissue by filtering the fiber-free autologous adipose tissue through the second filter, and additionally crushing the autologous adipose tissue by filtering the resulting filtrate through the third filter.

According to one embodiment of the present invention, in Step C2), the fiber-free autologous adipose tissue may be injected into a filter bag, and the fiber-free autologous adipose tissue may be crushed by filtering it through a filter by applying an external pressure. Specifically, in Step C2), the fiber-free autologous adipose tissue may be injected into a filter bag, and the autologous adipose tissue may be crushed by sequentially filtering the fiber-free autologous adipose tissue through a second filter and a third filter using a tool such as a silicone spatula from the outside.

In the present specification, the filter bag is a closed pouch-shaped filter kit formed of a flexible plastic material, and may include an inlet at one side and an outlet at the other side, and its internal space may be partitioned by filters.

In Step C2), examples of the second filter and the third filter may be used by modification of a filter bag of the Lipocell kit produced by Tiss'you. However, the present invention is not limited to the above example, and a filter suitable for the purpose of the present invention may be used.

As in Step C2), when the autologous adipose tissue is crushed using filters with gradually decreased pore diameters, the time for micronizing the autologous adipose tissue may be greatly reduced, and cells in the adipose tissue extract may maintain high cell activity. Specifically, when Step C2) is used, although adipose tissue is micronized by a physical method, there is an advantage of ensuring a large amount of adipose tissue, active cells and active proteins, which are effective in treatment. Further, when Step C2) is used, it is possible to collect ECM and growth factors in an optimally active state, and also have physical properties capable of performing 3D bioprinting.

Step C3) may be to obtain an adipose tissue extract by filtering the autologous adipose tissue crushed according to Step C2) through the fourth filter, and collecting a residue collected by the fourth filter. Specifically, in Step C3), an adipose tissue extract may be obtained by filtering the crushed autologous adipose tissue through the fourth filter having a pore diameter of 25 to 75 μm, removing the filtrate, and collecting a residue collected by the fourth filter. Specifically, in Step C3), the filtrate obtained through the fourth filter may be discarded, and a material captured by the fourth filter may be obtained. Specifically, in Step C3), the autologous adipose tissue crushed through Step C2) may be mixed with physiological saline, filtered using the fourth filter, the filtrate may be separated and removed, and a material captured by the fourth filter may be used as a crude adipose extract. The material removed by filtration may include adipose tissue which is excessively micronized and decreased in cell activity, blood and physiological saline, which may be removed due to interference with the cartilage regeneration activity intended in the present invention.

In Step C3), the fiber-free autologous adipose tissue and physiological saline may be injected into a filter bag, and then a material filtered through the fourth filter may be removed. Specifically, in Step C3), the fiber-free autologous adipose tissue and physiological saline may be injected into a filter bag, and the crushed autologous adipose tissue may be filtered through the fourth filter by applying a proper pressure.

One example of the fourth filter in Step C3) may be used by modifying a filter bag of a Lipocell kit produced by Tiss'you. However, the present invention is not limited thereto, and a filter suitable for the purpose of the present invention may be used.

The adipose tissue extract prepared according to the present invention may abundantly contain, particularly, growth factors required for cartilage regeneration, active cells and active proteins. Further, as a bioprinting composition (for example, a first liquid) using the adipose tissue extract may be maintained to have a suitable viscosity and printed at a constant rate without blocking a nozzle in bioprinting, it may be suitable for the formation of a skin regeneration sheet requiring precise bioprinting.

In addition, since the adipose tissue extract may be obtained to have the maximum amounts of growth factors, active cells and active proteins within a short period of time, enabling more effective treatment.

According to one embodiment of the present invention, the cell concentration of the stromal vascular fraction may be $10^5$ to $10^7$ per 1 mL of the composition for regenerating cartilage. When the cell concentration of the stromal vascular fraction is within the above-described range, cartilage differentiation ability and cartilage regeneration ability may be greatly improved in the case of implanting the patient-customized scaffold for regenerating cartilage produced using the composition for regenerating cartilage, or forming an implant by injecting the composition for regenerating cartilage into a lesion.

The stromal vascular fraction may be used with the lyophilization hyaline cartilage powder, thereby differentiating into chondrocytes. Therefore, in the case of implanting the patient-customized scaffold for regenerating cartilage produced using the composition for regenerating cartilage, or forming an implant by injecting the composition for regenerating cartilage into a lesion, the differentiation into chondrocytes in the lesion may be actively induced.

According to one embodiment of the present invention, with respect to 5 to 100 mg of the lyophilization hyaline cartilage powder, the total cell number of stromal vascular fraction may be $10^5$ to $10^7$. Preferably, with respect to 5 to 70 mg of the lyophilization hyaline cartilage powder, the total cell number of stromal vascular fraction may be $10^5$ to $10^7$. More preferably, with respect to 5 to 30 mg of the lyophilization hyaline cartilage powder, the total cell number of stromal vascular fraction may be $10^5$ to $10^7$.

According to one embodiment of the present invention, in Step D), a bioadhesive may be additionally mixed.

According to one embodiment of the present invention, the bioadhesive may include at least one selected from the group consisting of fibrin glue, gelatin glue, cyanoacrylate-based glue and polyurethane-based glue. Specifically, the bioadhesive may be fibrin glue and/or gelatin glue, and more specifically, fibrin glue.

When fibrin glue is applied as the bioadhesive, the composition for regenerating cartilage includes fibrinogen as a bioadhesive, and may be used with a separate composition including thrombin. Specifically, to produce a scaffold, the composition for regenerating cartilage containing fibrinogen may be applied, and then solidified into a scaffold using a thrombin-containing composition. In addition, the composition for regenerating cartilage containing fibrinogen may be injected into a defective cartilage area, and solidified using a thrombin-containing composition, thereby forming an implant in the defective region.

According to one embodiment of the present invention, the composition for regenerating cartilage may include fibrinogen, and further include aprotinin. The aprotinin is an inhibitor of a protease secreted from the pancreas, which is a polypeptide consisting of a total of 58 amino acids. Aprotinin is known to be usually extracted from bovine lungs, prevent fibrin degradation in blood, and serve to stop bleeding.

According to one embodiment of the present invention, the fibrinogen may be included at 65 to 115 mg per mL of the composition for regenerating cartilage.

According to one embodiment of the present invention, the aprotinin may be included at 900 to 1,100 Kininogen Inactivator Unit (KIU), and specifically, 1000 KIU, per 1 mL of the composition for regenerating cartilage.

Specifically, according to one embodiment of the present invention, the composition for regenerating cartilage may include $10^5$ to $10^7$ cells of adipose tissue-derived stromal vascular fraction, 5 to 100 mg of lyophilization hyaline cartilage powder, 65 to 115 mg of fibrinogen and 900 to 1,100 KIU of aprotinin per 1 mL thereof.

According to one embodiment of the present invention, the thrombin-containing composition may contain thrombin in a calcium chloride solution.

Specifically, the thrombin-containing composition may include 400 to 600 IU of thrombin and 5 to 6.5 mg of calcium chloride per 1 mL thereof.

A solvent for the composition for regenerating cartilage and the thrombin-containing composition may be water, specifically, physiological saline. In addition, fibrinogen in the composition for regenerating cartilage and thrombin in the thrombin-containing composition may be obtained from a commercial fibrin glue kit.

Another aspect of the present invention provides a composition for regenerating cartilage prepared using the above-described preparation method.

Still another aspect of the present invention provides a method of producing a patient-customized scaffold for regenerating cartilage, which includes: a) obtaining 3D data of a defective cartilage area using a 3D scanner, and forming a mold for a scaffold using a 3D printer; b) preparing a first liquid by mixing fibrinogen with the composition for regenerating cartilage using the lyophilization hyaline cartilage powder, and forming a first layer by coating the inside of the mold for a scaffold with the first liquid; c) forming a second layer by coating the first layer with a second liquid containing thrombin; and d) forming a scaffold for regenerating cartilage by reacting the first layer and the second layer.

In Step a), a 3D scanner and a 3D printer, which are known in the art, may be used. In addition, the mold for a scaffold may serve to fix the 3D shape when the first and second liquids are applied. The mold for a scaffold may be removed after the production of the scaffold for regenerating cartilage. The mold for a scaffold may be formed using a biocompatible polymer which is generally used in the art.

According to one embodiment of the present invention. Steps b) and c) may be implemented using an inkjet printing or 3D printing. Specifically. Steps b) and c) may use a printing device having two or more nozzles, known in the art, and a 3D shape may be created by discharging the first and second liquids from respective nozzles.

According to one embodiment of the present invention, Steps b) and c) may be alternately performed twice or more. Specifically, when the formation of a scaffold for regenerating cartilage with a large volume is needed. Steps b) and c) may be alternately performed to stack layers in the order of "first layer/second layer/first layer/second layer," and solidify the layers, thereby forming a scaffold for regenerating cartilage.

According to one embodiment of the present invention, Step d) may be completed within 10 minutes, and preferably, completed within 5 minutes. Specifically, in Step d), a scaffold for regenerating cartilage may be formed by reaction of the first layers and the second layers for 3 to 7 minutes.

The present invention may use fibrin glue consisting of fibrinogen and fibrin as an adhesive, which can ensure a higher viscosity than a hyaluronic acid adhesive or a collagen adhesive, and therefore, the patient-customized scaffold for regenerating cartilage may have excellent adhesive strength to a lesion and maintain high strength.

Yet another aspect of the present invention provides a patient-customized scaffold for regenerating cartilage, which is produced using the method of producing a patient-customized scaffold for regenerating cartilage.

The patient-customized scaffold for regenerating cartilage may be implanted by being formed in a shape corresponding to a defective cartilage region within a short time, as described above. The patient-customized scaffold for regenerating cartilage does not need a culturing process for cells, and after implantation, an adipose tissue-derived stromal vascular fraction in the scaffold is differentiated into chondrocytes, and the lyophilization hyaline cartilage powder may activate cartilage regeneration, and increase the survival rate of regenerated chondrocytes.

When the patient-customized scaffold for regenerating cartilage is implanted into a lesion, the regeneration of the intrinsic hyaline cartilage of cartilage (specifically, knee cartilage) may be induced by hyaline cartilage growth factors and proteins, released from the lyophilization hyaline cartilage powder. Therefore, when the patient-customized scaffold for regenerating cartilage is applied to a lesion, it may be effectively restored to the same or similar state compared to conventional cartilage.

Yet another aspect of the present invention provides a medical kit for regenerating cartilage in which the composition for regenerating cartilage is charged into a syringe for human injection. Specifically, in the medical kit for regenerating cartilage, a composition for regenerating cartilage including the lyophilization hyaline cartilage powder, the adipose tissue-derived stromal vascular fraction and the bioadhesive is charged in a syringe.

In addition, the medical kit for regenerating cartilage may include a first syringe in which a composition for regenerating cartilage including the lyophilization hyaline cartilage powder, the adipose tissue-derived stromal vascular fraction and fibrinogen is charged; and a second syringe in which a thrombin-containing composition is charged. As described above, after the composition for regenerating cartilage is injected into a defective cartilage area using the first syringe, the thrombin-containing composition in the second syringe may be injected to form an implant in the defective cartilage area.

Yet another aspect of the present invention provides a method of treating defective cartilage, which includes injecting the composition for regenerating cartilage into the defective cartilage region. The method of treating defective cartilage may be performed using the above-described medical kit for regenerating cartilage.

In the case of conventional autologous chondrocyte transplantation and stem cell transplantation, to extract tissue in the defective chondrocyte region of a patient, after a first incision of a lesion, a second incision for implantation into the lesion through the tissue culture process is needed, and thus two surgical procedures are required. On the contrary, the method of treating defective cartilage using the patient-customized scaffold for regenerating cartilage and the medical kit for regenerating cartilage disclosed in the present invention has an advantage of implanting a scaffold corresponding to the defective cartilage region within a short time, or forming an implant by directly injecting the composition into the defective area after the defective cartilage region is confirmed through the first incision.

EXAMPLES

Hereinafter, the present invention will be described in detail with reference to examples to help in understanding the present invention. However, examples according to the present invention may be modified in a variety of different forms, and it should not be construed that the scope of the present invention is not limited to the following examples. The examples of the present invention are provided to more completely explain the present invention to those of ordinary skill in the art.

[Comparative Example 1]—Preparation of General Hyaline Cartilage Powder

The obtained hyaline cartilage tissue was sliced without separate processing and then powdered using a ball mill.

FIG. 1 is a set of images showing hyaline cartilage tissue according to Comparative Example 1 and a result of powdering thereof. Referring to FIG. 1, when hyaline cartilage which was not separately lyophilization was powdered, it can be confirmed that agglomeration occurred due to internal water.

[Example 1]—Preparation of Lyophilization Hyaline Cartilage Powder

After the obtained hyaline cartilage tissue was sliced, freeze-drying was performed for approximately 12 hours under a pressure of approximately 5 bar at a temperature of approximately −80° C. in an atmosphere close to a vacuum, and powdered using a ball mill.

FIG. 2 is a set of images showing a lyophilization hyaline cartilage tissue according to Example 1 and a result of powdering thereof. Referring to FIG. 2, unlike FIG. 1, it can be confirmed that the hyaline cartilage powder was micronized into very fine particles without aggregation.

That is, there may have problems in that the hyaline cartilage powder prepared as in Comparative Example 1 requires a separate dispersion process due to agglomeration and a printer nozzle may be blocked. Moreover, it is inconvenient because the hyaline cartilage powder prepared as in Comparative Example 1 needs to be frozen at approximately −20° C. On the other hand, the lyophilization hyaline cartilage powder prepared as in Example 1 had no problem even when stored at room temperature after being prepared, and therefore, since a thawing process can be omitted in treatment, the lyophilization hyaline cartilage powder is very easily applied. Therefore, the lyophilization hyaline cartilage powder prepared as in Example 1 has an advantage of having very high uniformity in particle size compared to the hyaline cartilage powder prepared as in Comparative Example 1.

FIG. 3 is a set of images showing the results prepared by adjusting particle sizes of hyaline cartilage powder according to Comparative Example 1 and Example 1. Referring to FIG. 3, it can be confirmed that the lyophilization hyaline cartilage powder as in Example 1 had higher uniformity in particle size than the general hyaline cartilage powder as in Comparative Example 1.

[Experimental Example 1]—Experiment for Biocompatibility of Lyophilization Hyaline Cartilage Powder To confirm the biocompatibility and regeneration ability of the hyaline cartilage powder prepared as in Example 1, after injection into the dermis of a laboratory mouse, 4 and 12 weeks later, the result of the cell compatibility of the lyophilization hyaline cartilage powder was observed through hematoxylin & eosin (H&E) staining.

FIG. 4 shows the results after 4 weeks and 12 weeks according to Experimental Example 1. Specifically, referring to FIG. 4, after 4 weeks, it can be confirmed that cells were concentrated around the implanted lyophilization hyaline cartilage powder, and after 12 weeks, the cells concentrated around the lyophilization hyaline cartilage powder formed new tissue. Accordingly, it can be confirmed that although the hyaline cartilage was lyophilization, there was no side effect such as inflammation or the decrease in regeneration ability in tissue.

[Experimental Example 2]—Animal Experiment (In Vivo Experiment) for Confirming Cartilage Regeneration Autologous adipose tissue was obtained by extracting 70 to 150 mL of an aspirate from the abdomen of a laboratory beagle using liposuction after anesthetization, allowing the aspirate to stand for approximately 5 minutes, and then removing saline and a precipitate derived from blood, which were extracted along with the adipose tissue.

Subsequently, a syringe containing the fat of the experimental subject and a fresh syringe were installed in a two-way inlet of a connector with a stainless syringe filter (Adnizer, SKT-AN-2400, BSL) having a pore diameter of 2.4 mm, and fibers were removed from the autologous adipose tissue by passing the fat through a filter twice or three times by piston movement.

Subsequently, the fiber-free fat was injected into a filter bag (Adipose tissue processing device, Tiss'you) including a PET filter having a pore diameter of 500 μm, and filtered using a silicone spatula. Further, the fat passing through the 500-μm filter was filtered in the same manner using a filter bag (Adipose tissue processing device, Tiss'you) including a PET filter having a pore diameter of 200 μm. Afterward, the fat passing through the 200-μm filter was injected into a filter bag (Adipose tissue processing device, Tiss'you) including a PET filter having a pore diameter of 50 μm with the same amount of physiological saline, and physiological saline and other impurities were filtered, thereby obtaining an adipose tissue extract remaining on the filter.

The obtained adipose tissue extract and 10 mg of the lyophilization hyaline cartilage powder prepared in Example 1 were mixed with physiological saline, centrifuged at 4° C. for 5 minutes at 1000 rpm to remove a physiological saline supernatant. Further, a first liquid was prepared by mixing the resulting solution with 1 mL of a fibrinogen-mixed aprotinin solution using a mixing syringe, and 1 mL of a thrombin-dispersed calcium chloride solution was prepared as a second liquid.

The knee femoral condyle of the experimental beagle was exposed, and a defective region with a diameter of 6 mm and a depth of approximately 2 mm was formed.

To form a mold for a scaffold, 3D data of the defective cartilage area of the experimental beagle was obtained using a 3D scanner, and based on this, a medical-grade polycaprolactone (PCL) outer wall was printed using a 3D Bio 3D printer (INVIVO, ROKIT). Further, the first liquid and the second liquid were sequentially applied in the mold for a scaffold using a 3D Bio 3D printer (INVIVO, ROKIT), and then solidified for 5 minutes, thereby producing a scaffold for regenerating cartilage.

100 μL of fibrin glue (Beriplast) was injected into the defective region of the experimental beagle, and the prepared patient-customized scaffold for regenerating cartilage was implanted, followed by suturing a surgical area.

Afterward, after 8 weeks and 12 weeks, the cartilage regeneration in the defective area was examined using MRI. For comparison with Experimental Example 2, the examination was also performed with Comparative Experimental Example in which a defective region was formed in the cartilage area of an experimental beagle under the same conditions and then sutured without separate treatment.

FIG. 5 shows MRI results according to Experimental Example 2 and Comparative Experimental Example. Specifically. FIG. 5 shows the MRI results at week 8 and week 12 for Comparative Experimental Example (lyophilization hyaline cartilage powder (−)) and Experimental Example 2 (lyophilization hyaline cartilage powder (+)). In the week 8 result, although both of the Comparative Experimental Example and Experimental Example 2 showed no apparent recovery effect, in the week 12 result. Experimental Example 2 showed clear cartilage tissue recovery.

From the result of Experimental Example 2, it can be confirmed that the composition for regenerating cartilage using the lyophilization hyaline cartilage powder according to the present invention and the scaffold for regenerating cartilage using the same have excellent cartilage regeneration effects.

As above, as specific parts of the specification have been described in detail, although it is clear to those skilled in the art that this specific technique is merely a preferred embodiment, the scope of the specification is not limited thereto. Thus, the substantial scope of the specification will be defined by the accompanying claims and their equivalents.

The invention claimed is:

1. A method of preparing a composition for regenerating cartilage using lyophilization hyaline cartilage powder, comprising:
   A) preparing hyaline cartilage;
   B) preparing lyophilization hyaline cartilage powder by freeze-drying and crushing the hyaline cartilage;
   C) preparing an adipose tissue extract from an autologous adipose tissue; and
   D) preparing a composition for regenerating cartilage which includes the lyophilization hyaline cartilage powder and the adipose tissue extract,
   wherein Step C) comprises C1) removing fibers in autologous adipose tissue using a first filter having a pore diameter of 2 to 3 mm; C2) sequentially filtering the fiber-free autologous adipose tissue through a second filter having a pore diameter of 450 to 550 μm and a third filter having a pore diameter of 150 to 250 μm, and crushing the autologous adipose tissue; and C3) obtaining an adipose tissue extract by filtering the crushed autologous adipose tissue through a fourth filter having a pore diameter of 25 to 75 μm, and then collecting a residue collected by the fourth filter,
   wherein the concentration of the lyophilization hyaline cartilage powder is 5 mg to 70 mg per ml of the composition, and
   wherein the lyophilization hyaline cartilage powder has a particle diameter of 30 μm or more and 300 μm or less.

2. The method of claim 1, wherein the adipose tissue extract comprises a stromal vascular fraction isolated from autologous adipose tissue.

3. The method of claim 1, wherein, in Step D), a bioadhesive is additionally added and mixed.

4. The method of claim 3, wherein the bioadhesive includes at least one selected from the group consisting of fibrin glue, gelatin glue, cyanoacrylate-based glue and polyurethane-based glue.

5. The method of claim 2, wherein the cell concentration of the stromal vascular fraction is $10^5$ to $10^7$ per 1 mL of the composition for regenerating cartilage.

6. The method of claim 1, wherein the hyaline cartilage is derived from hyaline cartilage of the same species as a treatment target.

7. The method of claim 1, wherein the hyaline cartilage is derived from costal cartilage.

8. A method of producing a patient-customized scaffold for regenerating cartilage, comprising:
   a) obtaining 3D data of a defective cartilage area using a 3D scanner, and forming a mold for a scaffold using a 3D printer;
   b) preparing a composition for regenerating cartilage using lyophilization hyaline cartilage powder by the method of claim 1;
   c) preparing a first liquid by mixing fibrinogen with the composition for regenerating cartilage using the lyophilization hyaline cartilage powder, and forming a first layer by coating the inside of the mold for the scaffold with the first liquid;
   d) forming a second layer by coating the first layer with a second liquid containing thrombin; and
   e) forming a scaffold for regenerating cartilage by reacting the first layer and the second layer.

* * * * *